US005739784A

United States Patent [19]
Jan et al.

[11] Patent Number: 5,739,784
[45] Date of Patent: Apr. 14, 1998

[54] METHOD AND BEAM STEPPING APPARATUS FOR A SATELLITE CELLULAR COMMUNICATION SYSTEM

[75] Inventors: Yih Guang Jan; Kenneth Maynard Peterson, both of Phoenix, Ariz.

[73] Assignee: Motorola, Inc., Schaumburg, Ill.

[21] Appl. No.: 560,605

[22] Filed: Nov. 20, 1995

[51] Int. Cl.⁶ ................................ H04B 7/185
[52] U.S. Cl. .................... 342/354; 342/372; 342/373
[58] Field of Search ........................ 342/354, 372, 342/374, 373

[56] References Cited

U.S. PATENT DOCUMENTS

| | | | |
|---|---|---|---|
| 3,725,929 | 4/1973 | Spanos | 343/844 |
| 3,737,899 | 6/1973 | Georgopoulos | 343/5 R |
| 4,090,199 | 5/1978 | Archer | 343/100 SA |
| 4,691,205 | 9/1987 | Profera, Jr. | 342/365 |
| 5,103,232 | 4/1992 | Chang et al. | 342/372 |
| 5,353,032 | 10/1994 | Bertocchi et al. | 342/373 |
| 5,408,237 | 4/1995 | Patterson et al. | 342/354 |
| 5,444,445 | 8/1995 | Poskett et al. | 342/354 |
| 5,548,254 | 8/1996 | Sturza | 342/372 |

OTHER PUBLICATIONS

"The Globalstar System", Applied Microwave & Wireless Summer 1995, Edward Hirschfield, pp. 26–41.

*Primary Examiner*—Thomas H. Tarcza
*Assistant Examiner*—Dao I. Phan
*Attorney, Agent, or Firm*—Gregory J. Gorrie

[57] ABSTRACT

In a satellite cellular communication system (10), a phased array antenna (41) includes a dynamic beamformer (50) that provides individual antenna beams (35) within which communications with subscriber units (26) take place. The satellites (12) are located in several orbits (14). As the satellites move with respect to Earth's surface, each of the antenna beams is stepped backward (104) to compensate for the satellites movement. After each satellite travels a distance equal to a predetermined portion of the satellites' spacing in the orbit, each satellite's antenna beams are stepped forward (116) to replace the previous satellite's footprint. Accordingly, cell-to-cell hand-off is not required for subscriber units communicating within an antenna beam.

21 Claims, 7 Drawing Sheets

METHOD AND BEAM STEPPING APPARATUS FOR A SATELLITE CELLULAR COMMUNICATION SYSTEM

FIELD OF THE INVENTION

This invention relates in general to the field of cellular communication system, in particular to satellite communications and more particularly to phased array antennas for cellular communications.

BACKGROUND OF THE INVENTION

One problem which cellular communications systems address is the handing-off of communications between cells. Relative movement between subscriber units and cells causes the subscriber units and the communication links directed thereto to move between cells. In order to permit continuous communications in an ongoing call, the system must "hand-off" the communication when the end user crosses a cell boundary. If a communication is not handed off to a new cell upon leaving an old cell, the communication will eventually be lost because the strength of signals over which communications take place would diminish to a point where the system's radio equipment cannot receive the subscriber unit's transmissions, or vice versa.

A satellite cellular communication system with non-geosynchronous orbiting satellites must address the motion of the satellite antenna beam coverage areas relative to the subscriber units. The satellite beams sweep over the earth's service at such a high rate of speed that a given subscriber will move through a number of beams in the course of a particular call. In many cases, a subscriber unit may also be serviced by two or more different satellites during a call.

Typically, a conventional cellular communication system deals with the satellite motion by "handing-off" subscriber units from beam to beam or satellite to satellite when the subscriber unit detects that better service is available in a new antenna beam. Whenever one of these hand-offs occurs, the subscriber unit is assigned a new communication channel in the new beam. Each of these hand-offs requires the exchange of signaling data between the satellite and the subscriber unit. If these signaling messages are not received in a timely manner, the call may be dropped when the current beam no longer provides enough signal strength to maintain the link.

The hand-off rate increases rapidly as the number of beams is increased to provide more antenna gain, better link performance or a smaller channel reuse distance. In some satellite systems, there are many antenna beams per satellite. As a result, subscriber units may be hand-off from beam to beam as often as once per minute and between satellites about once in five minutes. When the number of beams is increased or more satellites are used, the beam to beam hand-off interval may be reduced to 15 seconds or less. The additional processing and bandwidth required to support this increased hand-off rate, along with the loss in call completion reliability creates an undesirable situation, especially with systems using smaller antenna beams.

A second problem with the channel to channel hand-off is that channels must be available to receive the hand-off. If no free channel exists in the requested antenna beam, the hand-off cannot be completed and the call may be dropped. As a result, a pool of available channels must be available for hand-offs.

Thus what is needed are a method and apparatus that reduces the amount of processing and bandwidth required

2 for handing-off communications between cells. What is also needed are a method and apparatus that reduces the hand-off rate and reduces the risk of dropped calls. What is also needed are a method and apparatus that allows a subscriber unit to use the same communication channel in subsequent cells. What is also needed are a cellular communication system that does not require a pool of channels to be maintained for hand-offs.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a method and apparatus that reduces the amount of processing and bandwidth required for handing-off communications between cells. The present invention also provides a method and apparatus that reduces the hand-off rate and reduces the risk of dropped calls. The present invention also provides a method and apparatus that allows a subscriber unit to use the same communication channel in subsequent cells. The present invention also provides a cellular communication system that does not require a pool of channels to be maintained for hand-offs.

In one preferred embodiment, these advantages of the present invention are accomplished through a method of stepping antenna beams in a satellite cellular communication system. Each of the beams are stepped back to compensate for movement of the satellites. In this embodiment, the satellites step their antenna beams forward to cover a previous satellite's footprint after the satellite travels a certain distance. In the preferred embodiment, these advantages of the present invention are also accomplished by a phased array antenna subsystem having a plurality of phase-shift matrices and a beam controller. The beam controller provides instructions to the phase shift matrices for stepping back each antenna beam to compensate for satellite movement. The beam controller also provides instructions for stepping forward each antenna beam after the satellite travels a certain distance.

A "satellite" is defined herein to mean a man-made object or vehicle intended to orbit Earth and includes low earth orbiting (LEO) satellites. A "constellation" is defined herein to mean an ensemble of satellites arranged in orbits for providing specified coverage (e.g., radio communication, photogrammetry, etc.) of portion(s) or all of Earth. A constellation typically includes multiple rings (or planes) of satellites and may have equal numbers of satellites in each plane, although this is not essential. As used herein the terms "cell", "antenna beam", "footprint" and "antenna pattern" are not intended to be limited to any particular mode of generation.

Figure 1:
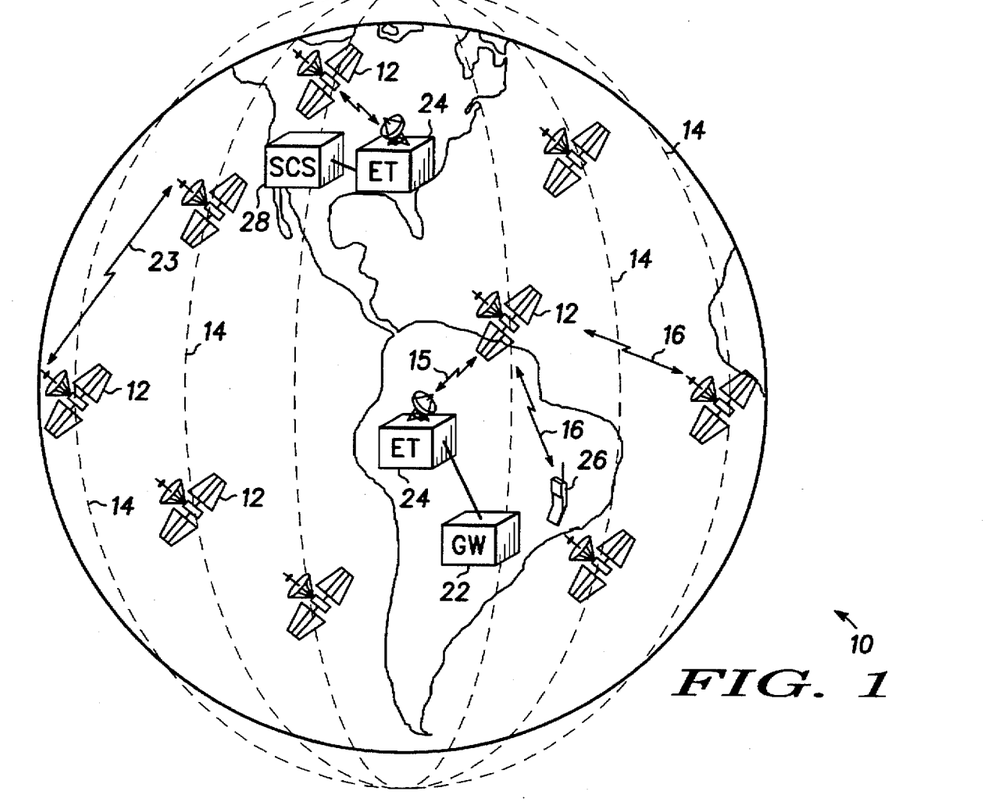
FIG. 1 illustrates a highly simplified diagram of a satellite-based communication system with which the present invention may be practiced.

FIG. 1 illustrates a highly simplified diagram of a satellite-based communication system with which the present invention may be practiced. Communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite or reception of signals by any one satellite involves or covers a relatively small area of Earth at any instant. For the example shown, satellites 12 travel with respect to Earth at around 25,000 km/hr, allowing satellite 12 to be visible for a maximum period of approximately nine minutes.

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

System 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiple Access (FDMA) and/or Time Division Multiple Access (TDMA) communications or combination thereof. Links 16 may also include combinations of L-Band channels that encompass Code Division Multiple Access (CDMA) communications. Preferably, each satellite 12 supports up to a thousand or more traffic channels so that each satellite 12 can simultaneously service a like number of independent calls.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

Figure 2:
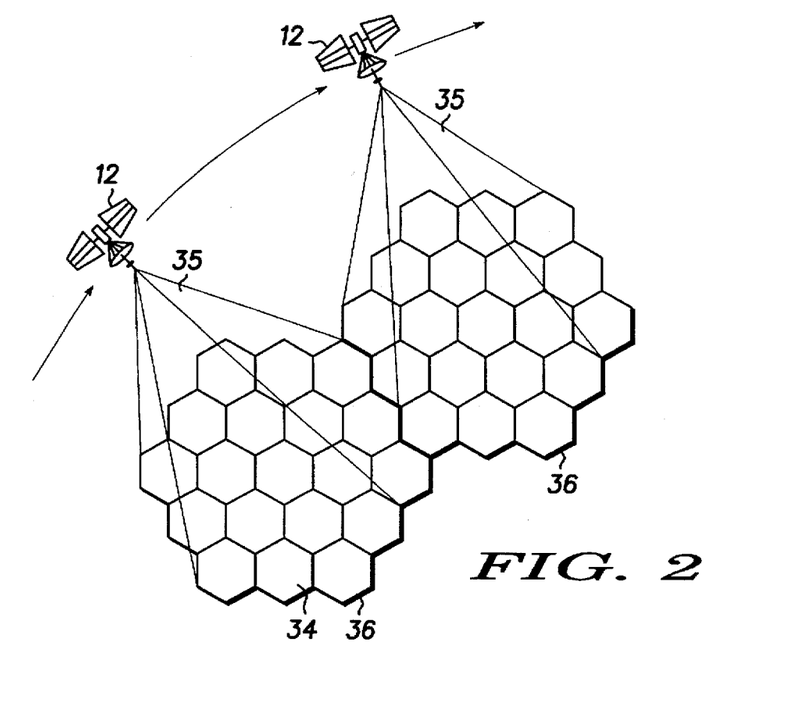
FIG. 2 illustrates a simplified diagram of a portion of a cellular pattern formed on the surface of the Earth in accordance with a preferred embodiment of the present invention.

FIG. 2 illustrates a simplified diagram of a portion of a cellular pattern formed on the surface of the Earth in accordance with a preferred embodiment of the present invention. Cellular pattern is formed by satellites for the communication system of FIG. 1. Each satellite 12 includes a phased array antenna. The array projects numerous discrete antenna beams 35 on the Earth's surface at numerous diverse angles away from its satellite 12. The resulting pattern of cells 34 that satellites 12 form on the surface of the Earth is shown in FIG. 2. A footprint region 36 results from the antenna beams 35 produced by an antenna array of a single satellite 12. Cells which reside outside of region 36 are produced by antenna arrays from other satellites 12.

Figure 3:
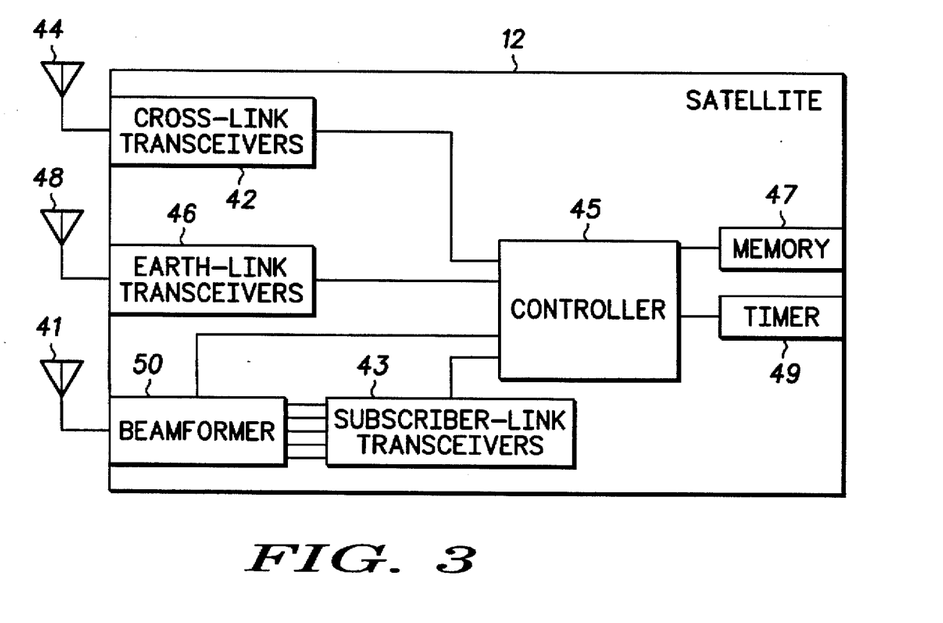
FIG. 3 illustrates a simplified block diagram of a satellite radio communication station in accordance with a preferred embodiment of the present invention.

FIG. 3 illustrates a simplified block diagram of a satellite radio communication station suitable for use in a preferred embodiment of the present invention. Preferably, all satellites 12 within system 10 (see FIG. 1) include equipment as illustrated by the block diagram. Satellite 12 includes cross-link transceivers 42 and associated antennas 44. Transceivers 42 and antennas 44 support cross-links to other nearby satellites 12. Earth-link transceivers 46 and associated antennas 48 support earth-links to communicate with earth terminals 24 (FIG. 1). Subscriber-link transceivers 43 and associated antennas 41 support subscriber units 26 (FIG. 1). Of course, those skilled in the art will appreciate that antennas 44, and 48 may be implemented either as single multi-directional antennas or as banks of discrete antennas.

Subscriber-link antenna 41 is preferably a phased array antenna capable of accessing many cells simultaneously. Coupled between subscriber-link antenna and subscriber-link transceivers is dynamic beamformer 50 which dynamically controls each of the antenna beams associated with subscriber-link antenna 41 as satellite 12 moves. The functions of beamformer 50 are described in more detail below.

A controller 45 couples each of transceivers 42, 46, and 44 as well as to a memory 47 and a timer 49. Controller 45 may be implemented using one or more processors. Controller 45 uses timer 49 to maintain, among other things, the current date and time. Memory 47 stores data that serve as instructions to controller 45 and that, when executed by controller 45, cause satellite 12 to carry out procedures which are discussed below. In addition, memory 47 includes variables, tables, and databases that are manipulated during the operation of satellite 12.

Subscriber-link transceivers 43 are desirably multi-channel FDMA/TDMA transceivers capable of transmitting and receiving on all different selectable frequencies during particular, selectable, time slots as directed by controller 45. Subscriber-link transceivers 43 may also support CDMA communications. Subscriber-link transceivers 43 contain multi-channel radios having sufficient number of channels to provide the desired number of transmission and reception frequencies for signal access and control and for the user voice and/or data. In the preferred embodiment where each satellite provides forty-eight individual antenna beams, subscriber-link transceivers 43 provides for reception and transmission of forty-eight radio frequency (L-band) channel sets, one for each antenna beam.

Figure 4:
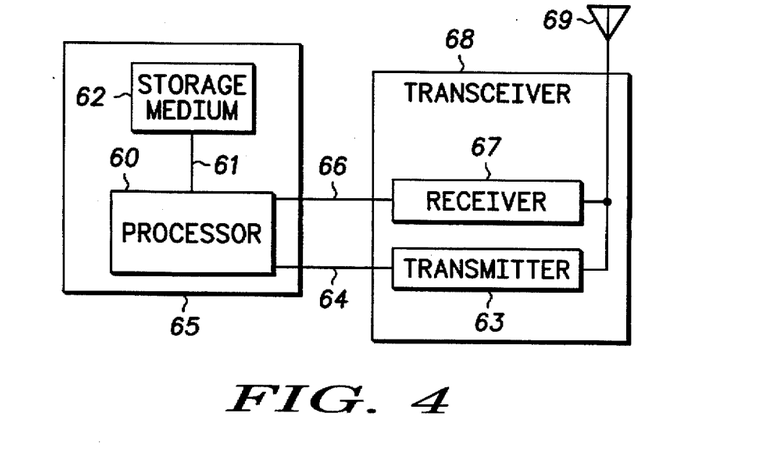
FIG. 4 illustrates a simplified block diagram of a system control station and an earth terminal in accordance with a preferred embodiment of the present invention.

FIG. 4 illustrates a simplified block diagram of a system control station and an earth terminal suitable for use in a preferred embodiment of the present invention. Control station 65 and terrestrial station 68 are desirable part of SCS 28 (FIG. 1) and ET 24 (FIG. 1) respectively. Control station 65 comprises processor 60 coupled to associated storage medium 62 via link 61. Terrestrial station 68 includes antenna 69 coupled to transmitter 63 and receiver 67. Transmitter 63 and receiver 67 are coupled to processor 60 via links 64 and 66, respectively. Processor 60 desirably carries out procedures exemplified below and described in the associated text. Transmitter 63 and/or receiver 67 transmit messages to and/or receive messages from earth-link antennas 48 of satellites 12.

Processor 60 generally controls and manages user access, message reception and transmission, channel set-up, radio tuning, frequency and time slot assignment, and other cellular radio communication and control functions not managed or provided for by controller 45 (FIG. 3). Among other things, processor 60 and/or controller 45 (FIG. 3) desirably executes procedures to allow user access to communication system 10. This may include procedures for protocols for channel setup and other associated functions as discussed below. In one embodiment of the present invention, control station 65 calculates antenna beam forming coefficients for subscriber-link antennas 41 (FIG. 3) and transmits these coefficients to the satellites. This is discussed in more detail below.

Figure 5:
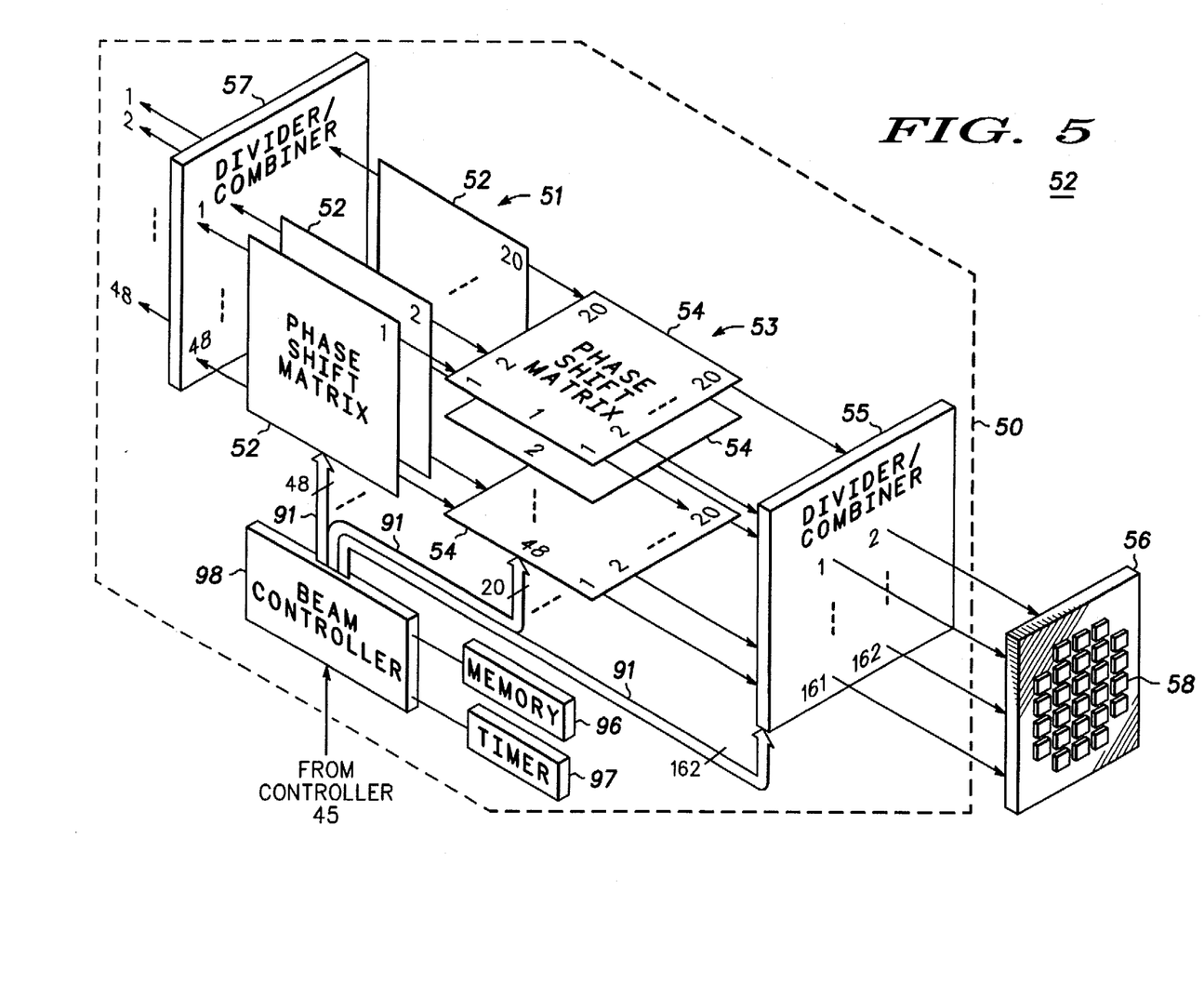
FIG. 5 illustrates a simplified block diagram of a dynamic beamformer in accordance with a preferred embodiment with the present invention.

FIG. 5 illustrates a simplified block diagram of a dynamic beamformer 50 in accordance with a preferred embodiment with the present invention. For simplicity, dynamic beamformer 50 is described herein as being in a transmitting mode, however dynamic beamformer 50 operates essentially the same in a receiving mode.

Beamformer 50 includes signal divider/combiner 57 that receives signals from subscriber-link transceivers. Divider/combiner 57 preferably includes one input for each antenna beam of a satellite's footprint. In the preferred embodiment, there are forty-eight inputs to divider/combiner 57. Divider/combiner 57 divides each signal and provides in-phase signals to each one dimensional phase-shift matrix 52. Preferably, each phase-shift matrix has forty-eight inputs and forty-eight outputs (referred to as a 48×48 phase-shift matrix). The plurality of phase-shift matrices 52 comprise a two-dimensional phase-shift matrix 51. In the preferred embodiment, there are at least twenty one-dimensional phase-shift matrices 51. As a result, divider/combiner 57 provides twenty output signals for each of it's forty-eight inputs.

Beamformer 50 also includes a second two-dimensional phase-shift matrix 53 comprised of a plurality of one-dimensional phase-shift matrices 54. In the preferred embodiment, each one-dimensional phase-shift matrix 54 has twenty inputs and twenty outputs (referred to as a 20×20 phase-shift matrix). Each one-dimensional phase-shift matrices 54 is coupled as shown to every one-dimensional phase-shift matrices 52. In the preferred embodiment, there are forty-eight one-dimensional phase-shift matrices 54 that comprise two-dimensional phase-shift matrix 53. Two-dimensional phase-shift matrix 53 provides a plurality of signals to divider/combiner 55 which provides a plurality of signals to antenna panel 56.

Antenna panel 56 is comprised of a plurality of individual radiators 58 arranged to provide in-phase addition and cancellation of the signals from divider/combiner 55 to produce a plurality of antenna beams. Preferably, antenna panel 56 generates a cellular pattern for a single satellite similar to that shown in FIG. 2. Preferably, divider/combiner 55 provides a signal to antenna panel 56 for each radiator 58. In the preferred embodiment, beamformer 50 generates forty-eight antenna beams (or cells) produced by 162 patch radiators 58 on antenna panel 56.

In the preferred embodiment, there are "M" phase-shift matrices 52, "N" phase-shift matrices 54 and "L" patch radiators 58, where "M" is between ten and forty, "N" is between thirty-six and seventy-two and "L" is between 100 and 200. The specific numbers depend on the number of antenna beams per footprint, the accuracy of the beam projections, desired sidelobe levels, spacing between antenna radiators, frequency of operation, etc.

Beamformer 50 also includes beam controller 98, memory 96 and timer 97. Beam controller 98 provides control signals to each phase-shift matrix 52, each phase-shift matrix 54 and divider/combiner 55 through bus 91. The control signals include the beam forming coefficients. Control signals from beam controller 98 instruct phase-shift matrices 52, 54 to adjust the phase of each output. Control signals from beam controller 98 instruct divider/combiner 55 to adjust the amplitude of each output. In the preferred embodiment, beam controller 98 provides forty-eight phase-control signals to each of the twenty phase-shift matrices 52. In the preferred embodiment, beam controller 98 provides twenty phase-control signals to each of the fourth-eight phase-shift matrices 54. In the preferred embodiment, beam controller 98 provides 162 amplitude-control signals, one for each of the outputs of divider/combiner 55. Accordingly, a total of 2082 control signals are provided by beam controller 98. These control signals include antenna beam forming coefficients that provide for amplitude and phase control of the antenna beams for antenna beam stepping as described below.

Figure 6:
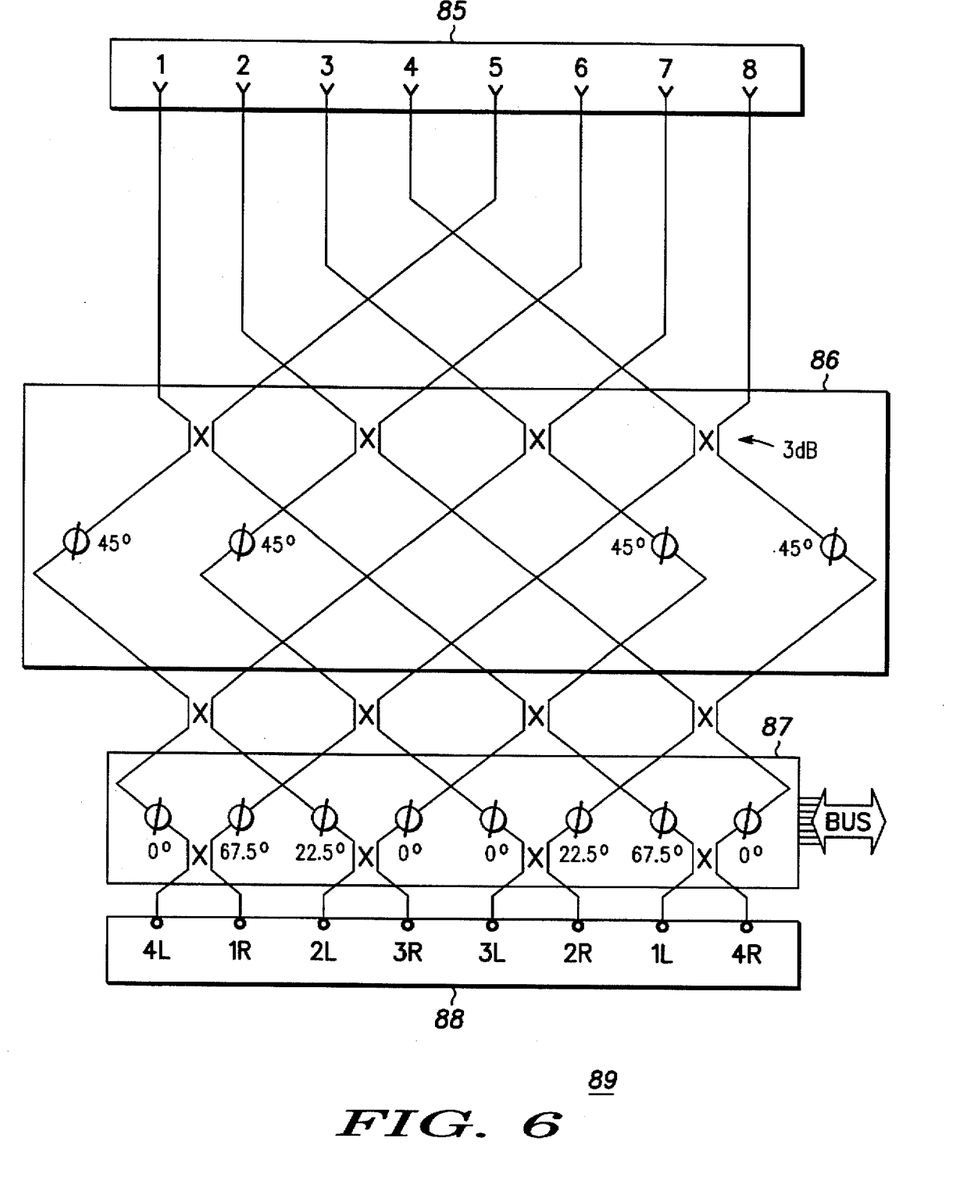
FIG. 6 is a simplified schematic of a portion of a phase-shift matrix in accordance with the present invention.

FIG. 6 is a simplified schematic of a portion of a phase-shift matrix 89 in accordance with a preferred embodiment the present invention. Phase-shift matrix 89 may be used in either phase-shift matrices 52, 54. Phase-shift matrix 89 has a plurality of inputs 85, a fixed phase-shift and coupling portion 86, a plurality of adjustable phase-shifters 87 and a plurality of outputs 88. For simplicity, phase-shift matrix 89 is shown with only eight inputs and outputs, and eight adjustable phase-shifters 87. In the preferred embodiment, phase-shift matrix has forty-eight inputs, outputs and adjustable phase-shifter when used for phase-shift matrix 52, and twenty inputs, outputs and adjustable phase-shifters when used of phase-shift matrix 54. Each adjustable phase-shifter has a control line associated therewith which receives control signals from beam controller 98 (FIG. 5) to control the amount of phase-shift in each adjustable phase-shifter of phase-shifters 87.

Figure 7:
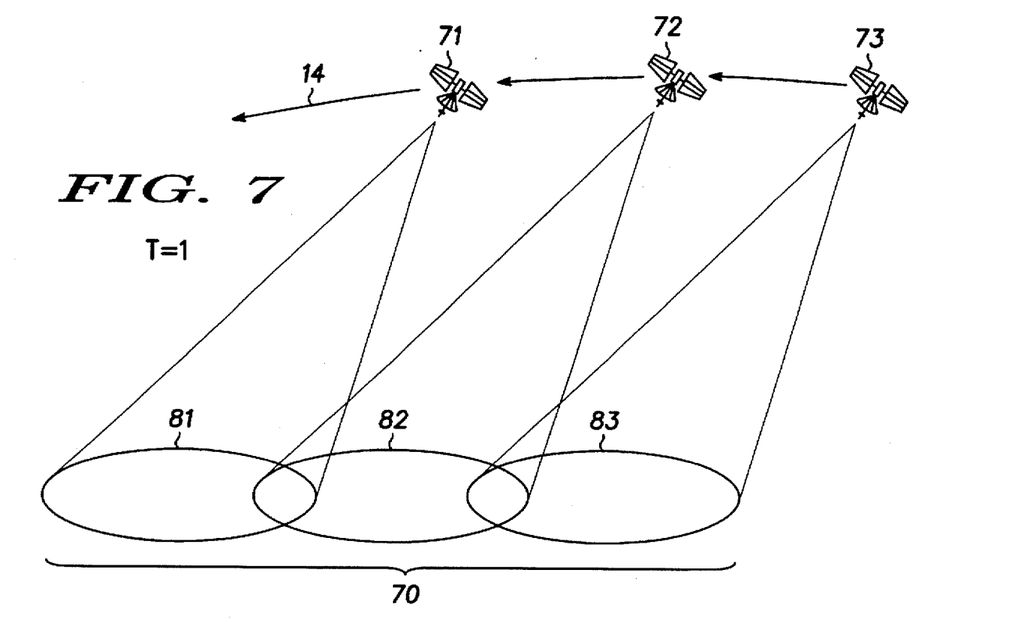
FIGS. 7, 8 and 9 illustrate satellite antenna beam projections at different times during a time interval in accordance with a preferred embodiment of the present invention.
Figure 8:
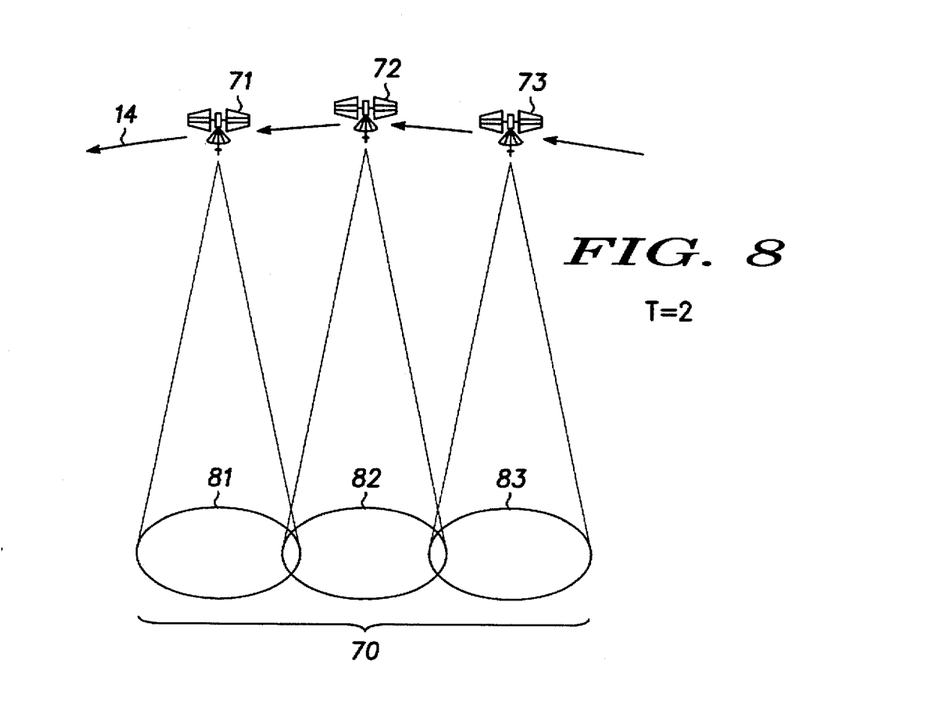
Figure 9:
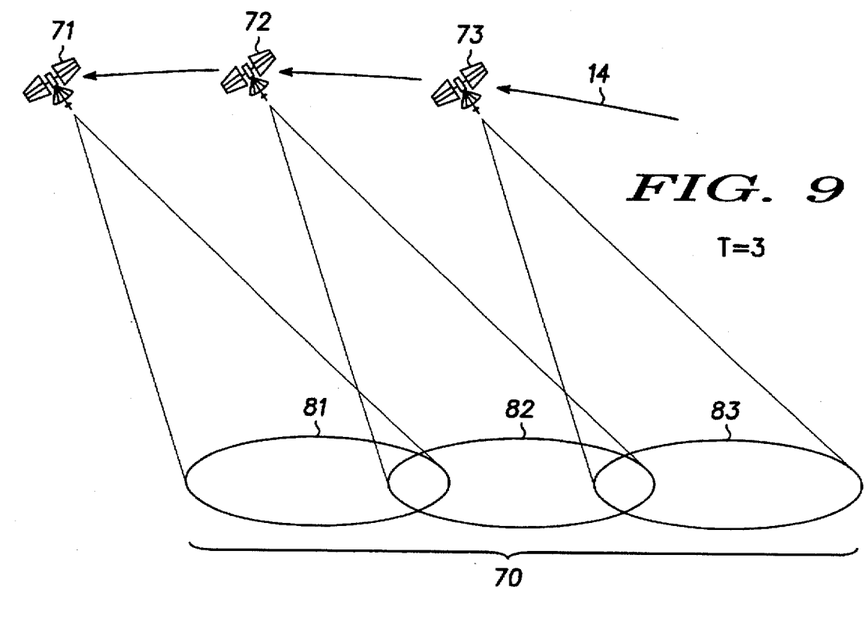

FIGS. 7, 8 and 9 illustrate satellite antenna beam projections at different times during a time interval in accordance with a preferred embodiment of the present invention. The different times during a time interval are illustrated as T=1, T=2 and T=3. FIGS. 7, 8 and 9 show satellites 71, 72 and 73 in orbital plane 14 above earth's surface. Satellites 71, 72 and 73 project antenna beams illustrated as footprint regions 81, 82 and 83 respectively on ground region 70. At an initial orbital position shown in FIG. 7, the satellites are projecting antenna beams in the direction of travel (i.e., forward). As a result, the beams are elongated in that direction.

As satellites 71, 72 and 73 travel through their orbit, the antenna beams are stepped back to compensate for the satellite's movement. Accordingly, the satellite footprints remain substantially over the same ground region during this time interval. This is illustrated in FIG. 8 where the satellites are shown as about midway through the time interval. At this point in time, the antenna beams are projected substantially downward (not forward or backward with respect to the direction of travel). As a result, the footprint regions are shown as substantially circular.

As the satellites continue through their orbit, their antenna beams continue to be stepped backward until the end of the time interval. Near the end of the time interval, the antenna beams are projected in the direction opposite of travel. As a result, the footprint regions are shown elongated in the direction opposite of travel, shown in FIG. 9.

During the time interval, all antenna beams of a satellite's footprint may be incrementally stepped back substantially simultaneously or individually. The stepping back of all the antenna beams of a satellite's footprint is performed once every subinterval of the interval. In the preferred embodiment, the antenna beams are stepped back a ground distance roughly ranging between 0.33 and 0.67 kilometers each subinterval.

At the end of the time interval, it is no longer desirable to continue to step each antenna beam of a satellite's footprint backward because, among other things, the beams become too elongated. Furthermore, ground coverage may be better provided by another satellite. After the time interval expires, the antenna beams of a satellite are stepped forward in their direction of travel. When stepped forward, the antenna beams of a satellite's footprint region are stepped forward to cover the footprint region of the satellite ahead of it. The antenna beams of the footprint region may be simultaneously or individually stepped forward at the end of an interval.

In the preferred embodiment, a satellite's footprint regions range roughly between 400 and 8000 kilometers in diameter on Earth's surface, the antenna beams of a satellite's footprint are stepped forward roughly between 400 and 8000 kilometers at the end of an interval.

Figure 10:
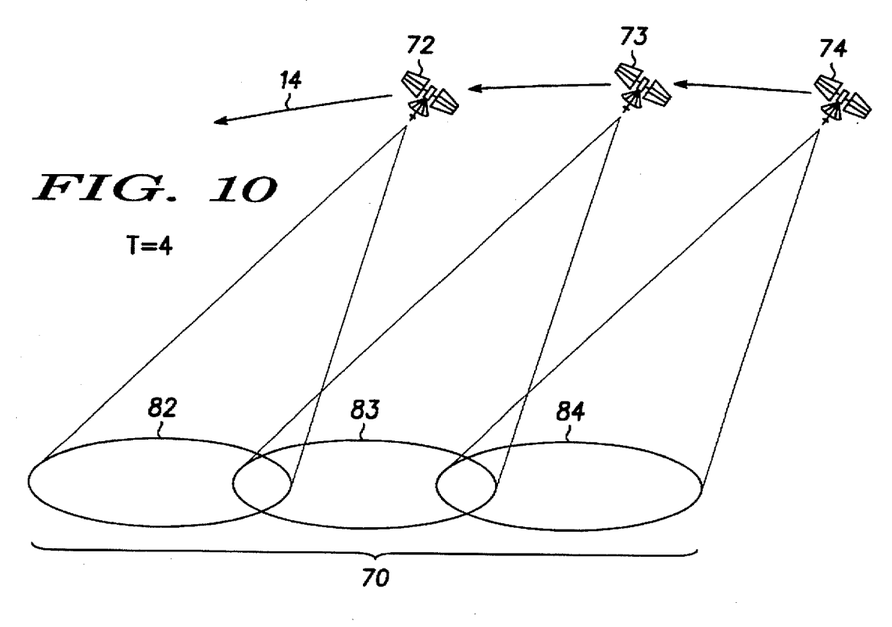
FIG. 10 illustrates satellite antenna beam projections near the beginning of a time interval in accordance with a preferred embodiment of the present invention.

FIG. 10 illustrates satellite antenna beam projections near the beginning of a time interval in accordance with a preferred embodiment the present invention. Satellites 72, 73 and 74 have been stepped ahead and are starting a new time interval, providing coverage for ground region 70. Footprint 84 of satellite 74 (FIG. 10) takes the place of footprint 83 shown in FIG. 9 at the beginning of the next interval. Footprint 83 of satellite 73 (FIG. 10) takes the place of footprint 82 shown in FIG. 9 at the beginning of this next interval. Footprint 82 of satellite 72 (FIG. 10) takes the place of footprint 81 shown in FIG. 9 at the beginning of this next interval. The footprint of satellite 71 (not shown in FIG. 10) takes the place of a footprint of another satellite at the beginning of this next interval. The process for stepping the antenna beams backward during a time interval and stepping the antenna beams forward after each time interval is described below.

Figure 11:
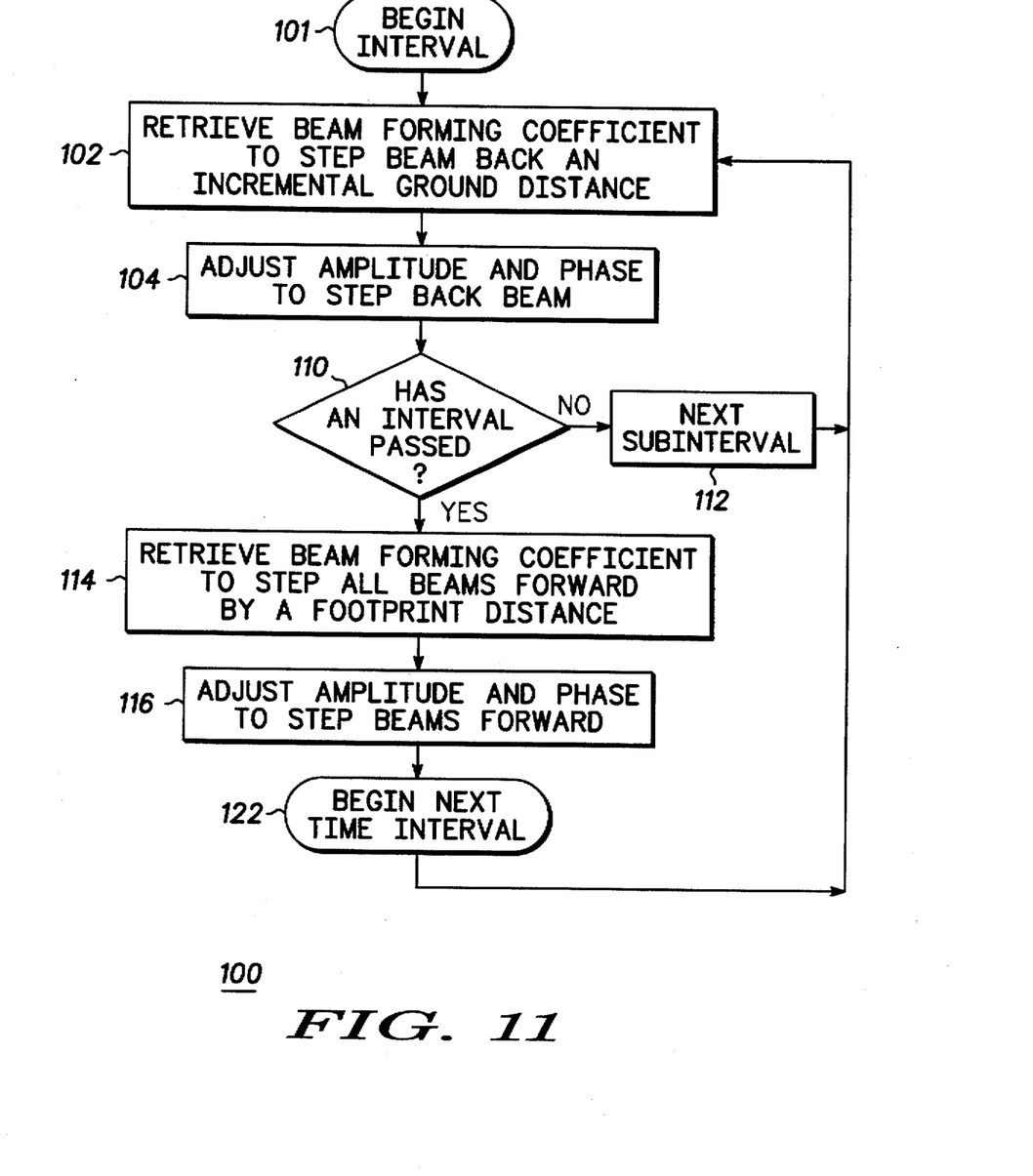
FIG. 11 is a simplified flow chart of a beam stepping procedure suitable for use in a preferred embodiment of the present invention.

FIG. 11 is a simplified flow chart of a beam stepping procedure suitable for use in a preferred embodiment of the present invention. Procedure 100 is preferably performed by beam controller 98 (FIG. 5) in conjunction with memory 96 and timer 97. Procedure 100 is preferably repeated once for each time interval, which is defined as a predetermined portion the time it takes for a satellite travel an orbital separation distance between adjacent satellites in an orbital plane 14 (FIG. 1). In the preferred embodiment, each time interval ranges between one-half and one-third of the orbital separation distance.

Task 101 begins the interval. Tasks 102–112 are performed during a subintervals, while tasks 114–122 are performed at the end of every interval. Many subintervals comprise an interval. Tasks 102–112 perform the task of stepping back the antenna beams of a satellite to compensate for the satellites movement with respect to earth's surface. Tasks 102–112 perform the tasks of stepping back antenna beams as shown through each of FIGS. 7–9. Tasks 114–122 perform the task of stepping forward the antenna beams of satellite to replace the footprint of a satellite that's ahead in orbit. For example, tasks 114–122 perform the task of stepping forward beams as shown between FIG. 9 and FIG. 10.

In task 102, the beam forming coefficients are retrieved from memory. The beam forming coefficients are calculated to step an antenna beam back an incremental ground distance that associated with an incremental orbital distance that a satellite travels during a predetermined subinterval of time.

In the preferred embodiment wherein communications on subscriber links 16 (FIG. 1) comprise TDMA frames, each frame being approximately ninety milliseconds, each subinterval is equal to about one frame or about 0.1 seconds. However, the time of a subinterval depends, among other things, on the processing capability of processors located within beam controller 98, the number of antenna beams per satellite, and the number of phase-shift matrices 51, 53 included within beamformer 50 (FIG. 5).

In task 104, the beam forming coefficients are adjusted to step back an antenna beam the incremental ground distance. In reference to FIG. 5, beam controller 98 sends phase control signals to phase-shift matrices 51 and 53, and sends amplitude control signals to divider/combiner 55. In the preferred embodiment, the control signals for all antenna beams are sent to phase-shifter matrices 51 and 53, and divider/combiner 55 at the same instant. Accordingly, all antenna beams are stepped back at the same time.

Task 110 determines when an interval has passed. An interval is preferably associated with a satellite's travel through its orbit equal to a portion of the separation distance between satellites in an orbital plane. When an interval has not passed, task 112 begins the next time subinterval. Task 112 may also wait until the next subinterval. After task 112, tasks 102 and 104 are repeated for the next subinterval of time. Accordingly, antenna beams are stepped back once every subinterval of time.

In the preferred embodiment wherein communications on subscriber links 16 (FIG. 1) comprise TDMA frames, each frame being approximately ninety milliseconds, each subinterval is equal to about one frame. In this embodiment, each interval is equal to a predetermined portion of the orbital period of a satellite divided by the number of satellites per plane.

When a predetermined number of subintervals has passed as determined in task 110 (i.e., when a satellite travels the orbital separation distance), task 114 is performed. In task 114, beam forming coefficients are retrieved from memory to step each antenna beam forward. The distance the antenna beams are stepped forward compensates for the distance the satellite traveled during an interval. This distance is preferably a portion, between one-third and one-half of the separation distance between satellites in an orbital plane. In task 116, beam controller 98 provides the phase control signals to phase-shifter matrices 51 and 53, and the amplitude control signals to divider/combiner 55. Accordingly, each antenna beam is stepped forward to provide coverage for the geographic location previously provided for by the satellite in the ahead orbital position.

Task 122 begins the next time interval, and the procedure is repeated for the next time interval. In the preferred embodiment, procedure 100 is performed by all satellites 12 in system 10 (FIG. 1) substantially simultaneously. In other words, the satellites are synchronized so that each performs task 116 at substantially the same time. In this way, all satellites step their antenna beams forward at the same time. Desirably, task 104 is also performed at substantially the same time for all satellites.

The synchronization may be accomplished thorough the use of timer 97 (FIG. 5) in conjunction with timer 49 (FIG. 3). Alternatively, SCS 28 may send control signals to each of the satellites instructing them when to perform task 116 and/or task 104.

In another embodiment of the present invention, tasks 102 and 114 dynamically calculate the appropriate beam forming coefficients, rather than retrieving them from a table stored in the satellites memory. In another embodiment of the present invention, the beam forming coefficients retrieved in tasks 102 and 114 are provided in real time, or near-real time from SCS 28. SCS may either have these coefficients stored in memory, or calculate the coefficients dynamically.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In a phased array antenna adapted for use on a satellite that moves with respect to Earth's surface, a method of stepping a plurality antenna beams, said plurality of antenna beams forming a footprint region on Earth's surface, said satellite having a memory for storing first and second sets of beam forming coefficients therein, the method comprising the steps of:

stepping back each antenna beam of said plurality to compensate for movement of said satellite; and stepping forward each antenna beam of said plurality a portion of a distance across said footprint region after repeating the stepping back step a predetermined number of times, wherein prior to the stepping back step, the method includes the steps of retrieving said first set of beam forming coefficients from said memory, and providing said first set of beam forming coefficients to a controller to control a phase and amplitude of said antenna beams, said first set of beam forming coefficients calculated to step each antenna beam back to compensate for said movement of said satellite, and wherein the stepping forward step includes the step of retrieving said second set of beam forming coefficients from said memory, and providing said second set of beam forming coefficients to said controller to control said phase and amplitude of said antenna beams, said second set of beam forming coefficients calculated to step said antenna beams forward said distance.

2. A method as claimed in claim 1 wherein said satellite is adapted for operating in a satellite communication system comprised of a plurality of satellites traveling in at least one orbital plane and separated by an orbital separation distance, and wherein each satellite has a timer, the method further comprises the step of repeating the step of stepping back until said satellite travels a portion of said orbital separation distance, and wherein the step of stepping back further comprises the step of adjusting antenna beam forming coefficients of said phased array antenna to maintain antenna coverage for a geographic region associated with said footprint region during a time said satellite travels said portion of said orbital separation distance, and wherein each of said satellites traveling in said one orbital plane perform the stepping forward step substantially synchronously using said timer.

3. In a phased array antenna adapted for use on a satellite that moves with respect to Earth's surface, a method of stepping a plurality antenna beams, said plurality of antenna beams forming a footprint region on Earth's surface, the method comprising the steps of:

stepping back each antenna beam of said plurality to compensate for movement of said satellite; and stepping forward each antenna beam of said plurality a portion of a distance across said footprint region after repeating the stepping back step a predetermined number of times, wherein said satellite is adapted for operating in a satellite communication system comprised of a plurality of satellites traveling in at least one orbital plane and separated by an orbital separation distance, the method further comprises the step of repeating the step of stepping back until said satellite travels a portion of said orbital separation distance, and wherein the step of stepping back further comprises the step of adjusting antenna beam forming coefficients of said phased array antenna to maintain antenna coverage for a geographic region associated with said footprint region during a time said satellite travels said portion of said orbital separation distance, wherein said satellite is in said one orbital plane with a second satellite and separated by said orbital separation distance, and wherein said portion is between one-half and one-third of said orbital separation distance, and wherein the method further comprises the steps of:

communicating with a subscriber unit within a first antenna beam of said plurality of antenna beams provided by said satellite using a communication channel during performance of the stepping back step; and communicating with said subscriber unit within a second antenna beam provided by said second satellite using said communication channel after performance of the stepping forward step.

4. A method as claimed in claim 3 wherein data packets are routed to said subscriber unit through said first antenna beam of said satellite, and wherein the method further comprises the step of rerouting said data packets to said subscriber unit through an antenna beam of said second satellite after performance of the stepping forward step.

5. A method as claimed in claim 3 wherein the stepping back step comprises the step of sequentially stepping back each antenna beam of said plurality to compensate for movement of said satellite, and wherein the stepping forward step further comprises the step of sequentially stepping forward each antenna beam of said plurality said portion of said distance across said footprint region after repeating the sequentially stepping back step said predetermined number of times.

6. A method as claimed in claim 3 wherein the stepping back step comprises the step of simultaneously stepping back each antenna beam of said plurality to compensate for movement of said satellite, and wherein the stepping forward step further comprises the step of simultaneously stepping forward each antenna beam of said plurality said portion of said distance across said footprint region after repeating the simultaneously stepping back step said predetermined number of times.

7. A method as claimed in claim 6 wherein said phased array antenna comprises a beam controller, and wherein the simultaneous stepping back step and the simultaneously stepping forward step further comprise the steps of:

providing, by said beam controller, a plurality of beam control signals to each of a plurality of phase shift matrices.

8. A method as claimed in claim 7 wherein said plurality of antenna beams includes "N" antenna beams, and wherein said phased array antenna includes:

"M" first phase-shift matrices, each first phase-shift matrix having "N" inputs and "N" outputs, each output having a phase controller associated therewith, each input of each first phase-shift matrix being associated with one of said "N" antenna beams;

"N" second phase-shift matrices, each second phase-shift matrix having "M" inputs and "M" outputs, each of said "M" outputs having a phase controller associated, each of said "M" inputs of said second phase-shift matrices being coupled to an output of each first phase-shift matrix; and a divider/combiner having "M×N" inputs coupled to said "M" outputs of each of said "N" second phase-shift matrices, said divider/combiner adapted for providing "L" outputs, each of said "L" outputs having an amplitude controller associated therewith, said "L" outputs for providing said "N" antenna beams, and wherein the stepping back step further comprises the step of providing control signals from a dynamic beam controller to each of said amplitude controllers and each of said phase controllers, said control signals, said control signals for causing each of said antenna beams to compensate for movement of said satellite.

9. A method as claimed in claim 8 wherein the stepping forward step further comprises the step of providing control signals from said dynamic beam controller to each of said amplitude controllers and each of said phase controllers, said control signals, said control signals for causing each of said antenna beams to step forward each of said "N" antenna beams said portion of said distance across said footprint region.

10. A method as claimed in claim 9 wherein the stepping forward step is performed by said satellites of said plurality substantially simultaneously.

11. A method for stepping antenna beams of a phased array antenna adapted for use in a satellite communication system that includes a plurality of satellite nodes that are moving with respect to earth's surface, each satellite node providing a plurality of said antenna beams on earth's surface, each plurality of antenna beams forming an antenna footprint associated with each satellite node, wherein each antenna beam of said plurality has a beam forming coefficient associated therewith, and wherein said satellite nodes travel at an orbital velocity and move an incremental orbital distance during a subinterval of time, and wherein each antenna beam of said plurality moves an incremental ground distance on earth's surface during said subinterval, said method comprising the steps of:

a) for each subinterval, changing each of said beam forming coefficients associated with each antenna beam to step back each of said antenna beams said incremental ground distance, wherein step (a) is performed for a predetermined number of said subintervals, said predetermined number of said subintervals comprising an interval; and (b) for said interval, changing each of said beam forming coefficients associated with each antenna beam to step forward each of said antenna beams a ground distance corresponding to a portion of an orbital separation distance between adjacent satellites in an orbital plane, wherein prior to the changing for each subinterval step, the method includes the step of retrieving a first set of beam forming coefficients from a memory, and wherein the changing for each subinterval step includes the step of providing said first set of beam forming coefficients to a controller to control a phase and amplitude of said antenna beams, said first set of beam forming coefficients calculated to step each antenna beam back said incremental ground distance, and wherein prior to the changing for each interval step, the method includes the step of retrieving a second set of beam forming coefficients from said memory, and wherein the changing for each interval step includes the step of providing said second set of beam forming coefficients to said controller to control said phase and amplitude of said antenna beams said second set of beam forming coefficients calculated to step said antenna beams forward said ground distance, wherein the method includes the step of repeating the step of changing for each subinterval step to provide communication services for substantially a first geographic region, and wherein subsequent to the changing each of said beam forming coefficients for said interval step, the method include the step of providing communication services to substantially a second geographic region.

12. A method as claimed in claim 11 wherein steps (a) and (b) are performed substantially simultaneously for each satellite node, and wherein step (b) comprises the step of replacing a portion of a footprint of a first satellite with a portion of a footprint of a second satellite, said second satellite following said first satellite in a same orbital plane as said first satellite.

13. A method as claimed in claim 12 wherein data packets are routed to a subscriber unit through an antenna beam of said first satellite, and wherein the method further comprises the steps of:

communicating with said subscriber unit within a first antenna beam provided by said first satellite using a communication channel during performance of step (a);

communicating with said subscriber unit within an antenna beam provided by said second satellite using said communication channel after performance of step (b); and rerouting said data packets to said subscriber unit through said antenna beam of said second satellite after performance of step (b).

14. A phased array antenna subsystem for providing "N" antenna beams and adapted for use on a non-geostationary satellite in a satellite cellular communication system, said phased array antenna subsystem comprising:

"M" first phase-shift matrices, each first phase-shift matrix having "N" inputs and "N" outputs, each output having a phase controller associated therewith, each input of each first phase-shift matrix being associated with one of said "N" antenna beams;

"N" second phase-shift matrices, each second phase-shift matrix having "M" inputs and "M" outputs, each of said "M" outputs having a phase controller associated, each of said "M" inputs of said second phase-shift matrices being coupled to an output of each first phase-shift matrix;

a divider/combiner having "M×N" inputs coupled to said "M" outputs of each of said "N" second phase-shift matrices, said divider/combiner adapted for providing "L" outputs, each of said "L" outputs having an amplitude controller associated therewith, said "L" outputs for providing said "N" antenna beams;

a dynamic beam controller adapted for providing control signals to each of said amplitude controllers and each of said phase controllers, said control signals, said control signals for stepping each of said "N" antenna beams backward to compensate for movement of said non-geostationary satellite; and a memory adapted for storing first and second sets of beam forming coefficients, said controller has means for retrieving said first set of beam forming coefficients and executing instructions to provide said control signals for controlling said amplitude and phase controllers in accordance with said first set of beam forming coefficients to step said antenna beams backward to provide communication services for a first geographic region, and wherein said controller also has means for retrieving said second set of beam forming coefficients and executing instructions to provide said control signals for controlling said amplitude and phase controllers in accordance with said second set of beam forming coefficients to step said antenna beams forward to provide communication services for a second geographic region.

15. A phased array antenna subsystem as claimed in claim 14 wherein said "N" antenna beams forms a footprint region on Earth's surface and wherein said beam controller is further adapted for providing additional control signals to said amplitude controllers and said phase controllers to step forward each of said "N" antenna beams by a portion of a distance across said footprint region.

16. A phased array antenna subsystem for providing "N" antenna beams and adapted for use on a non-geostationary satellite in a satellite cellular communication system, said phased array antenna subsystem comprising:

"M" first phase-shift matrices, each first phase-shift matrix having "N" inputs and "N" outputs, each output having a phase controller associated therewith, each input of each first phase-shift matrix being associated with one of said "N" antenna beams;

"N" second phase-shift matrices, each second phase-shift matrix having "M" inputs and "M" outputs, each of said "M" outputs having a phase controller associated, each of said "M" inputs of said second phase-shift matrices being coupled to an output of each first phase-shift matrix;

a divider/combiner having "M×N" inputs coupled to said "M" outputs of each of said "N" second phase-shift matrices, said divider/combiner adapted for providing "L" outputs, each of said "L" outputs having an amplitude controller associated therewith, said "L" outputs for providing said "N" antenna beams; and a dynamic beam controller adapted for providing control signals to each of said amplitude controllers and each of said phase controllers, said control signals, said control signals for causing each of said "N" antenna beams to compensate for movement of said non-geostationary satellite, wherein said "N" antenna beams forms a footprint region on Earth's surface and wherein said beam controller is further adapted for providing additional control signals to said amplitude controllers and said phase controllers to step forward each of said "N" antenna beams by a portion of a distance across said footprint region, said phased array antenna subsystem further comprising:

an antenna panel having "L" radiators, each radiator coupled to one of said "L" outputs of said divider/combiner, said "L" radiators configured for providing said "N" antenna beams;

a input divider/combiner adapted for providing signals associated with each of said "N" antenna beams, to each of said "N" inputs of said "M" first phase shift matrices;

a memory adapted for storing instructions for controlling said amplitude and phase controllers, said beam controller executing said instructions to provide said control signals; and timer adapted for synchronizing said instructions with other satellites in said satellite cellular communication system.

17. A phased array antenna subsystem as claimed in claim 16 wherein said satellite cellular communication system includes a satellite control center for providing said instructions to said phased array antenna subsystem, and provides synchronization signals to other satellites in said satellite cellular communication system, wherein said phased array antenna subsystem is adapted for substantially simultaneously stepping forward said "N" antenna beams with said other satellites in said satellite cellular communication system.

18. A phased array antenna subsystem as claimed in claim 17 further comprising:

means for communicating with a subscriber unit located in a first antenna beam provided by said phased array antenna subsystem using a communication channel when said dynamic beam controller is providing control signals to compensate for movement of said satellite; and means for handing-off communications with said subscriber unit to another antenna beam provided by a second satellite using said communication channel after said dynamic beam controller provides control signals to step forward each of said "N" antenna beams by said portion of said distance across said footprint region.

19. A phased array antenna subsystem as claimed in claim 18 wherein said signals associated with each of said "N" antenna beams are comprised of L-band frequencies, and where "N" is between 36 and 72, "M" is between 10 and 40, and "L" is between 100 and 200.

20. A dynamic beamforming apparatus for a phase array antenna adapted for a non-geostationary satellite in a satellite communication system comprising:

a phase-shift matrix adapted for providing a plurality of antenna beams;

a beam controller adapted for providing beam forming coefficients to said phase-shift matrix, said beam forming coefficients shifting each of said antenna beams to compensate for movement of said non-geostationary satellite; and a memory coupled to said controller for storing said beam forming coefficients, said controller having means for retrieving a first set of said beam forming coefficients for stepping back each antenna beam to compensate for movement of said satellite and provide communication services to a first geographic region, said controller having means for retrieving a second set of said beam forming coefficients to step forward each antenna beam to provide communication services to a second geographic coverage subsequent to providing communication services to said first geographic region.

21. A dynamic beamforming apparatus as claimed in claim 20 wherein said second set of beam forming coefficients cause said controller to step forward each antenna beam a portion of a distance across a footprint region after stepping back said antenna beams for a predetermined duration.

* * * * *